United States Patent Office 3,794,632
Patented Feb. 26, 1974

3,794,632
ACTH-ACTION PEPTIDES
Werner Rittel, Basel, Switzerland, assignor to Ciba-Geigy Corporation, Ardsley, N.Y.
No Drawing. Filed May 19, 1971, Ser. No. 145,032
Claims priority, application Switzerland, May 27, 1970, 7,836/70
Int. Cl. C07c *103/52*
U.S. Cl. 260—112.5        5 Claims

ABSTRACT OF THE DISCLOSURE

Peptides or peptide amides which possess 18–24 aminoacids from the N-terminal of the natural corticotropines, but in which the first aminoacid is replaced by β-alanine and the aminoacids in the 17-position and 18-position are replaced by L-lysine or L-ornithine or analogues of these compounds in which one or more aminoacids in the positions 3–5 11, 15 and 16 are replaced by other α-aminoacids and acid addition salts and complexes of these compounds.

---

The invention relates to peptides with increased and prolonged adrenocorticotropic activity that possess 18–24 aminoacids from the N-terminal of the natural corticotropines, but in which the first aminoacid, serine, is replaced by β-alanine and the amino acids in the 17-position and 18-position are replaced by L-lysine or L-ornithine, and also analogues of these peptides which instead of the serine residue in the 3-position contain the residue of glycine and/or instead of the methionine residue in the 4-position contain the residue of L-norleucine and/or instead of the glutamic acid residue in the 5-position contain the residue of L-glutamine and/or instead of the lysine residue in the 11-, and/or 15- and 16-positions contain the residue of L-ornithine, as well as C-terminal amides of these peptides, and acid addition salts and complexes of these compounds. It has been found that the new peptides possess a stronger and longer adrenocorticotropic action than the known ACTH-active peptides. Compounds to be particulary highlighted are the N-terminal amides of the peptides with 18–19 aminoacids, above all β-Ala$^1$-Lys$^{17,18}$-β$^{1-18}$-corticotropine-Lys$^{18}$-amide.

As acid addition salts, salts of therapeutically usable acids such as hydrochloric acid or acetic acid, but above all sparingly soluble salts such as sulphates, phosphates, sulphonates or higher alkanoates such as for example stearates should be mentioned.

By complexes there are to be understood the complex-like compounds of as yet unclarified structure which are produced on addition of certain inorganic or organic substances to adrenocorticotropically active peptides, and above all those which impart a prolonged action to them. Such inorganic substances are compounds which are derived from metals such as calcium, magnesium, aluminium, cobalt and especially zinc, above all sparingly soluble salts such as phosphates, pyrophosphates and polyphosphates, as well as hydroxides of these metals, and also alkali metal polyphosphates such as for example "Calgon N," "Calgon 322," "Calgon 188" or "Polyron B-12." Organic substances which cause a prolongation of the action are for example non-antigenic gelatine, for example hydroxypolygelatine, polyvinylpyrrolindone and carboxymethylcellulose, and also sulphonic acid or phosphoric acid esters of alginic acid, dextran, polyphenols and polyalcohols, above all polyphloretin phosphate and phytic acid, as well as polymers of aminoacids, for example protamine, polyglutamic acid or polyaspartic acid.

The new compounds show a high and long-lasting adrenocorticotropic action, for example in the test according to Desaulles and Rittel (Memoirs of the Soc. for Endocrinology, 1968 No. 17, pp. 124–137), wherein the elimination of corticosterone from the suprarenal glands of hypophysectomized rats is measured after subcutaneous injection of the peptide. The new compounds can therefore be used as medicines in place of the natural corticotropines.

The process according to the invention for the manufacture of the new compounds is characterised in that the protective groups are split off from protected peptides and peptide amides which possess 18–24 aminoacids from the N-terminal of the natural corticotropines, but in which the first aminoacid is replaced by β-alanine and the aminoacids in the 17-position and 18-position are replaced by L-lysine or L-ornithine or analogues of these compounds in which one or more of the aminoacids in the positions 3–5, 11, 15 and 16 are replaced by other α-aminoacids and, if desired, the resulting compounds are converted into their acid addition salts or complexes.

As protective groups for the starting substances and for the intermediate products required in the synthesis of the starting substances, groups are used that can be easily eliminated, for example by hydrolysis, reduction, aminolysis, hydrazinolysis or photolysis espectially the groups known for the synthesis of peptides in particular those that are known for the synthesis of ATH-sequences.

As protective groups for the amino groups there are used for example, acyl or aralkyl groups, such as formyl, trifluoracetyl, phthaloyl, benzenesulphonyl, p-toluensulphonyl, o-nitrophenylsulphenyl, and 2,4-dinitrophenylsulphenyl groups (these sulphenyl groups can also be removed by the action of nucleophilic reagents, for example sulphites or thiosulphates, compare British Pat. 1,104,271) optionally substituted benzyl groups, for example benzyl groups substituted by lower alkyl or lower alkoxy groups, especially methyl or o- or p-methoxy groups, or diphenylmethyl or triphenylmethyl groups, or groups derived from carbonic acid such as arylmethoxycarbonyl groups which are optionally substituted in the aromatic rings, for example by halogen atoms such as chlorine or bromine, nitro groups, lower alkyl or lower alkoxy groups or chromophoic groups, for example azo groups, in which arylmethoxycarbonyl groups the methylene group can be substituted by a further aryl radical and/or one or optionally two lower alkyl radicals, such as benzyl, benzhydryl- or 2-phenyl-isopropyl-oxycarbonyl groups, for example carbobenzoxy, p-bromocarbobenzoxy or p - chlorocarbobenzoxy, p - nitrocarbobenzoxy or p-methoxycarbobenzoxy, p - phenylazo - benzyloxycarbonyl and p-(p'-methoxyphenylazo)-benzyloxycarbonyl, 2-tolyl-isopropoxycarbonyl and especially 2-(p-biphenylyl)-isopropoxycarbonyl, as well as aliphatic oxycarbonyl groups such as adamantyloxycarbonyl, cyclopentyloxycarbonyl, 2,2,2 - trichlorethoxycarbonyl, 2 - iodethoxycarbonyl, tert. amyloxycarbonyl or above all tert.-butoxycarbonyl.

The amino groups can also be protected by the formation of enamines, obtained by reaction of the amino group with 1,3-diketones, for example benzoylacetone, acetylacetone or dimedone.

Carboxyl groups are for example protected by amide or hydrazide formation or by esterification. The amide and hydrazide groups can optionally be substituted, the amide group for example by the 3,4-dimethoxybenzyl or bis-(p-methoxyphenyl)-methyl group, the hydrazide group for example by the carbobenzoxy group, the trichlorethoxycarbonyl group, the trifluoroacetyl group, the trityl group, the tert.-butoxycarbonyl group or the 2-(p-biphenylyl-isopropoxy)-carbonyl group. Suitable substances for the esterification are for example lower optionally substituted alkanols such as methanol, ethanol, cyanomethyl alcohol, 2,2,2-trichlorethanol, 2-iodethanol, benzoylmethyl alcohol or especially tert.-butanol, and also aralkanols such as aryl-lower alkanols, for example benzyl alcohols or benzhydryl alcohols which are optionally substituted by lower alkyl or lower alkoxy groups or halogen atoms, such as p-nitrobenzyl alcohol, p-methoxybenzyl alcohol or 2,4,6-trimethylbenzyl alcohol, phenols and thiophenols which are optionally substituted by electron-attracting substituents, such as thiophenol, thiocresol, p-nitrothiophenol, 2,4,5- and 2,4,6-trichlorophenol, pentachlorophenol, p-nitrophenol, 2,4-dinitrophenol, p-cyanophenol or p-methanesulphonylphenol, and also, for example, N-hydroxysuccinimide, N-hydroxyphthalimide, N-hydroxypiperidine or 8-hydroxyquinoline.

A terminal carboxyl group can also be protected by esterification with a carrier resin as is used in the solid phase synthesis, for example with 4-hydroxy-3-nitrostyrene cross-linked by divinylbenzene.

The hydroxyl groups of the side chains, for example of the serine and/or tyrosine residues, can for example be protected by esterification or etherification. Possible acyl groups in the esterification are for example lower alkanoyl radicals such as acetyl, aroyl radicals such as benzoyl and above all radicals derived from carbonic acid such as benzyloxycarbonyl or ethoxycarbonyl. Suitable groups for the etherification are, for example, benzyl, tetrahydropyranyl or tert.butyl radicals. The 2,2,2-trifluoro-1-tert.-butoxycarbonylaminoethyl or -1-benzyloxycarbonylaminoethyl group described in Ber. 100 (1967), 3838–3849 (Weygand) are also suitable for protecting the hydroxyl groups. However, the hydroxyl groups do not necessarily have to be protected. In order to protect the amino group in the guanidino grouping of the arginine, the nitro group, the tosyl group or the adamantyloxy-carbonyl group may be employed, but the guanidino group does not have to be protected. Equally, it is not essential for the imino group of the histidine to be protected, but it can be advantageous to protect it, for example by benzyl, trityl or adamantyloxycarbonyl groups or by the 2,2,2-trifluoro-1-tert.-butoxycarbonylaminoethyl or -1-benzyloxycarbonylaminoethyl groups described in Ber. 100 (1967), 3838–3849. The protective groups are split off in a known manner as above mentioned in a single stage or optionally in several stages.

Preferably the protective groups are removed with an acid, for example, trifluoracetic acid, hydrochloric acid, hydrobromic aicd, for instance in glacial acetic acid, or hydrofluoric acid. These latter agents can also be used for simultaneously removing the terminal carboxyl group from a solid carrier resin.

Preferably, a starting peptide is used in which the amino groups of the side chain are protected by the tert.-butyloxycarbonyl group and the carboxyl groups of the side chain and of the C-terminal acid, to the extent that they are not amidized, are protected by the tert.butyl ester group. These protective groups are appropriately split off by means of trifluoroacetic acid or hydrochloric acid.

The resulting peptides can subsequently be converted into their acid addition salts of complexes in a manner which is in itself known.

The formation of acid addition salts is effected in a known manner.

The formation of complexes also takes place according to known methods, or methods equivalent to these.

Complexes with inorganic substances such as sparingly soluble metal compounds, for example aluminium or zinc compounds, are preferably manufactured in an analogous manner to that known for ACTH, for example by reaction with a soluble salt of the particular metal, for example zinc chloride or zinc sulphate, and precipitation with an alkali metal phosphate and/or alkali metal hydroxide. Complexes with organic compounds, such as polyhydroxygelatine, carboxymethylcellulose, polyvinylpyrrolidone, polyphloretine phosphate, polyglutamic acid and the like, are obtained by mixing these substances with the peptide in aqueous solution. Insoluble compounds with alkali metal polyphosphates can also be manufactured in the same manner.

The invention also relates to those embodiments of the process in which one starts from an intermediate product obtainable at any process stage and carries out the missing steps, or in which the process is stopped at any stage and/or a starting substance is formed in situ and/or is used in the form of a salt.

In order to manufacture the starting peptides, the aminoacids are linked in the desired sequence, either individually or after prior formation of smaller peptide units. The linking of the aminoacid and/or peptide units takes place by reacting an aminoacid or a peptide having a protected $\alpha$-amino group and activated terminal carboxyl group with an aminoacid or a peptide having a free $\alpha$-amino group and free or protected, for example esterified or amidized, terminal carboxyl group, or by reacting an aminoacid or peptide having an activated $\alpha$-amino group and protected terminal carboxyl group with an aminoacid or a peptide having a free terminal carboxyl group and protected $\alpha$-amino group. The carboxyl group can for example be activated by conversion into an acid azide, acid anhydride, acid imidazolide, acid isoxazolide or an activated ester such as a cyanomethyl ester, thiophenyl ester, p-nitrothiophenyl ester, thiocresyl ester, p-methanesulphonylphenyl ester, p-nitrophenyl ester, pentachlorophenyl ester, N-hydroxysuccinimide ester, N-hydroxyphthalimide ester, 8-hydroxyquinoline ester, N-hydroxypiperidine ester, or by reaction by means of a carbodiimide (optionally with the addition of N-hydroxysuccinimide or unsubstituted or, for example, halogen-substituted, methyl-substituted or methoxy-substituted 1-hydroxybenzotriazole of 3-hydroxy-4-oxo-3,4-dihydro-1,2,3-benzotriazine) or N,N'-carbonyldiimidazole, or an isoxazolium salt, for example Woodward reagent, and the amino group can for example be activated by reaction with a phosphite. As the most customary methods there should be mentioned the carbodiimide method, the method according to Weygand-Wünsch (carbodiimide in the presence of N-hydroxysuccinimide, the azide method, the method of activated esters and the anhydride method, and also the Merrifield method and the method of the N-carboxyanhydrides or N-thiocarboxyanhydrides.

Depending on the procedure, the new compounds are obtained in the form of bases or of their salts. The bases can be obtained from the salts in a manner which is in itself known. Salts can again be obtained from the bases by reaction with acids which are suitable for the formation of therapeutically useable salts, such as for example salts with inorganic acids, such as hydrohalic acids, for example hydrochloric acid or hydrobromic acid, perchloric acid, nitric acid or thiocyanic acid, sulphuric acid or phosphoric acid, or organic acids such as formic acid, acetic acid, propionic acid, glycollic acid, lactic acid, pyruvic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicylic acid, 4-aminosalicylic acid, 2-phenoxybenzoeic acid, 2-acetoxybenzoic acid, embonic acid, methanesulphonic acid, ethanesulphonic acid, hydroxyethanesulphonic acid, benzosulphonic acid, hydroxyethanesulphonic acid, benzenesulphonic acid, p-toluenesulphonic acid, naphthalene sulphonic acid or sulphanilic acid.

The peptides obtained according to the process can be used in the form of pharmaceutical preparations. These contain the peptides mixed with a pharmaceutical organic or inorganic excipient which is for example suitable for intravenous intramuscular, subcutaneous or intranasal administration. Possible substances for the excipient are those which do not react with the polypeptides, such as for example gelatine, lactose, glucose, starch, cellulose, for example "Avicel" (microcrystalline cellulose) and cellulose derivatives such as carboxymethylcellulose, methylcellulose or ethylcellulose, talc, magnesium stearate, gum, polyalkylene glycols, water, monohydric or polyhydric alcohols such as ethanol, isopropanol, glycerine, hexitol, vegetable oils and other fatty acid esters such as groundnut oil, cottonseed oil, almond oil, olive oil, castor oil, ethyl oleate, isopropyl myristate, isopropyl palmitate, "Cetiol V" (oleic acid esters of liquid fatty alcohols), "Miglyol" of "Labrafac" (triglyceride mixture of fatty acids with 8–12 carbon atoms), "Labrafil M 2735" or "Labrafac WL 1219" (mixtures of glycerine and polyoxyethylene fatty acid esters), "Arlacel" (sorbitan fatty acid ester), "Tween" (polyoxyethylene-sorbitane monooleate) or other known medicinal excipients. The pharmaceutical preparations can for example be in the form of tablets, dragées or capsules or in a liquid form as solutions, suspensions or emulsions. They are optionally sterilized and/or contain auxiliary substances such as preservatives, stabilizers, wetting agents or emulsifiers. They can also contain yet further therapeutically valuable substances.

For therapeutic purposes, 0.01 to 3 mg. of the peptide, in solution or suspension, for example as a zinc complex suspension or as a gelatine solution or as a polyphloretine phosphate solution, are employed. Of the solutions or suspensions, 0.1 to 5 ml. are administered, for example intravenously, intramuscularly, subcutaneously or intranasally. They can for example be used once to three times daily or once or several times per week. The free peptide is preferably used intravenously or intramuscularly and the complexes, for example zinc complexes, preferably intramuscularly or subcutaneously.

The invention is described in the examples which follow. The following abbreviations are used:

Boc=tert.butoxycarbonyl,
Z=carbobenzoxy
But=tert.butyl.

The following systems are used in thin layer chromatography:

System 101: n-butanol-pyridine-glacial acetic acid-water (38:24:8:30)
System 101 B: n-butanol-pyridine-glacial acetic acid-water (40:24:6:30)
System 115: glacial acetic acid-pyridine-formic acid-water (63:21:10:6)

EXAMPLE 1

H-β-Ala-Tyr-Ser-Met-Glu-His-Phe-Arg-Trp-Gly-Lys-Pro-Val-Gly-Lys-Lys-Lys-Lys-NH$_2$ 200 mg. of Boc-β-Ala-Tyr-Ser-Met-Glu(OBut)-His-Phe-Arg-Trp-Gly-Lys(BOC)-Pro-Val - Gly - Lys(BOC)-Lys(BOC)-Lys(BOC)-Lys(BOC)-NH$_2$ are introduced into 6 ml. of 90% strength trifluoracetic acid, the solution is left to stand for 90 minutes at 25° C. and then poured into 250 ml. of ice-cold, peroxide-free ether, and the fine precipitate is filtered off. This is thoroughly eluted with ether, dried and, in order to convert it into the acetic acid salt, dissolved in 5% strength acetic acid and filtered through a column of weakly basic ion exchanger (Merck No. II, acetate form). 5% strength acetic acid is used for rinsing, and the eluates are combined and lyophilized.

The free octadecapeptide-amide in thin layer chromatography on a cellulose layer shows $Rf_{101}=0.38$; on aluminium oxide "Alox" (of Messrs. Camag) $Rf_{101\ B}=0.33$.

The starting material can be manufactured as follows:
1.5 g. of Boc-β-Ala-Tyr-Ser-Met-Glu(OBut)-His-Phe-Arg-Trp-Gly-OH.4H$_2$O (Ann. 726, 185 (1969)) are finely powdered, 60 ml. of dimethylformamide are added and thereafter 1.8 g. of H-Lys(BOC)-Pro-Val-Gly-Lys(BOC)-Lys(BOC)-Lys(BOC)-Lys(BOC)-NH$_2$ (compare British Pat. 1,164,807) are added whilst stirring. 1.0 N aqueous hydrochloric acid and 300 mg. of N-hydroxysuccinimide are then added, the mixture is warmed to 45° C., and 300 mg. of dicyclohexylcarbodiimide are adde. The reaction mixture is stirred under nitrogen for 22 hours at 45° C., thereafter cooled to 0° C., and introduced into 1 litre of peroxide-free, ice-cold ether. After 18 hours standing at 0° C. the precipitate is filtered off, dried in vacuo at 35° C. reprecipitated twice from dimethylformamide-ethyl acetate in order to purify it, dried and precipitated from methanol-water.

The Boc-β-Ala-Tyr-Ser-Met-Glu(OBut)-His-Phe-Arg-Trp-Gly-Lys(Boc) - pro - Val-Gly-Lys(Boc)-Lys(Boc)-Lys(Boc)-Lys(Boc)-NH$_2$ in thin layer chromatography on "Alox" aluminum oxide plates (of Messrs. Camag) shows $Rf_{115}=0.75$.

EXAMPLE 2

A suspension is prepared from the following components:

| | Mg. |
|---|---|
| β-Ala$^1$-Lys$^{17,18}$-β1$^{-18}$ - corticotropin - Lys$^{18}$ - amide-acetate | 1.0 |
| ZnCl$_2$ | 5.25 |
| Na$_2$HPO$_4$·2H$_2$O | 1.05 |
| NaCl | 2.0 |
| Benzylalcohol | 10.0 |
| 0.6-n. NaOH ad pH 8.6. | |
| Aq. dest. ad 1.0 ml. | |

EXAMPLE 3

A suspension is prepared from the following components:

| | Mg. |
|---|---|
| β-Ala$^1$-Lys$^{17,18}$-β1$^{-18}$ - corticotropin - Lys$^{18}$ - amide-acetate | 0.5 |
| ZnCl$_2$ | 5.25 |
| Sodium polyphosphate (average chain length=26 | 1.00 |
| NaCl | 2.00 |
| Benzyl alcohol | 10.0 |
| O.5-n. NaOH ad pH 8.5. | |
| Aq. dest. ad 1.0 ml. | |

EXAMPLE 4

A suspension is prepared from the following components:

| | Mg. |
|---|---|
| β-Ala$^1$-Lys$^{17,18}$-β1$^{-18}$ - corticotropin - Lys$^{18}$ - amide-acetate | 1.0 |
| ZnCl$_2$ | 5.25 |
| Calgon® 322 | 2.0 |
| NaCl | 1.0 |
| Benzylalcohol | 10.0 |
| 0.5-n. NaOH ad pH 8.2. | |
| Aq. dest. ad 1.0 ml. | |

EXAMPLE 5

A solution for injection is prepared from the following components:

| | Mg. |
|---|---|
| β-Ala$^1$-Lys$^{17,18}$-β1$^{-18}$ - corticotropin - Lys$^{18}$-amide-acetate | 0.5 |
| Glacial acetic acid | 1.22 |
| Sodium acetate | 0.607 |
| Sodium chloride | 8.1 |
| Aq. dest. ad 1.0 ml. | |

EXAMPLE 6

A dry ampoule is prepared containing

| | Mg. |
|---|---|
| β-Ala$^1$-Lys$^{17,18}$-β1$^{-18}$ - corticotropin - Lys$^{18}$ - amide-acetate | 1.0 |
| Mannitol | 10.0 |

EXAMPLE 7

A nose powder is prepared from

| | Mg. |
|---|---|
| β-Ala$^1$-Lys$^{17,18}$-β1$^{-18}$ - cortocotropine-Lys$^{18}$ - amide-acetate | 1 |
| Mannitol | 50 |

EXAMPLE 8

A nose spray is prepared containing per single dose:

| | Mg. |
|---|---|
| $\beta$-Ala$^1$-Lys$^{17,18}$-$\beta$1–18 - corticotropin - Lys$^{18}$-amide-acetate | 1.0 |
| Benzylalcohol | 0.15 |
| Miglyol® 812 | 13.85 |
| Freon® 12/114 | 60.0 |

EXAMPLE 9

A suspension is prepared from the following components:

| | Mg. |
|---|---|
| $\beta$-Ala$^1$-Lys$^{17,18}$-$\beta$1–18 - corticotropin - Lys$^{18}$-amide-acetate | 0.5 |
| ZnCl$_2$ | 6.30 |
| Na$_2$HPO$_4$·2H$_2$O | 1.26 |
| NaCl | 1.50 |
| Benzylalcohol | 10.00 |

0.6-n. NaOH ad pH 8.5.
Aq. dest. ad 1.0 ml.

EXAMPLE 10

A suspension is prepared from the following components:

| | Mg. |
|---|---|
| $\beta$-Ala$^1$-Lys$^{17,18}$-$\beta$1–18 - corticotropin - Lys$^{18}$-amide-acetate | 1.00 |
| Glacial acetic acid | 1.22 |
| Sodium acetate | 0.602 |
| Sodium chloride | 8.10 |
| Benzylalcohol | 15.00 |
| Sodiumcarboxymethylcellulose | 10.0 |

Aq. dest. ad 1.0 ml.

I claim:

1. Peptides or peptide amides which possess 18–24 aminoacids from the N-terminal of the natural corticotropines, but in which the first aminoacid is replaced by $\beta$-alanine and the aminoacids in the 17-position and 18-position are replaced by L-lysine or L-ornithine or therapeutically acceptable acid addition salts of these compounds.

2. Peptides or peptide amides as claimed in claim 1, that possess 18–19 aminoacids of the N-terminal sequence of $\beta$-corticotropine, but in which the first aminoacid is replaced by $\beta$-alanine and the amino acids in the 17- and 18-positions are replaced by L-lysine or L-ornithine, or therapeutically acceptable acid addition salts or complexes thereof with zinc phosphate, zinc pyrophosphate, zinc polyphosphate and/or zinc hydroxide.

3. $\beta$-Ala$^1$-Lys$^{17,18}$-$\beta$1–18-corticotropine-Lys$^{18}$-amide, the therapeutically acceptable acid addition salts or complexes thereof with zinc phosphate, zinc pyrophosphate, zinc polyphosphate and/or zinc hydroxide.

4. Complexes of the peptides or peptide amides as claimed in claim 1 with zinc phosphate, zinc pyrophosphate, zinc polyphosphate and/or zinc hydroxide.

5. Complexes of the peptides or peptide amides as claimed in claim 1 with oxypolygelatine, carboxymethyl cellulose, polyphloretin phosphate or polyglutamic acid.

References Cited

UNITED STATES PATENTS

| | | | |
|---|---|---|---|
| 3,639,383 | 2/1972 | Geller | 260—112.5 |

FOREIGN PATENTS

| | | | |
|---|---|---|---|
| 1,119,353 | 7/1968 | Great Britain | 260—112.5 |
| 724,772 | 12/1968 | Belgium | 260—112.5 |
| 746,996 | 12/1968 | Belgium | 260—112.5 |
| 1,817,285 | 11/1968 | Germany. | |

OTHER REFERENCES

Geiger et al.: Liebigs Ann. Chem. 726 (1969), pp. 177–180 relied on.

Brugger et al.: Experientia 26/10 (1970), p. 1050 relied on.

ELBERT L. ROBERTS, Primary Examiner

U.S. Cl. X.R.

424—177